United States Patent [19]

Sanchez et al.

[11] Patent Number: 4,900,529
[45] Date of Patent: Feb. 13, 1990

[54] PROCESS FOR MAKING CRYSTALLINE SILICEOUS MATERIALS

[75] Inventors: Moises G. Sanchez, Severna Park; Charles C. Chang, Columbia; Norman R. Laine, Rockville; Sandra M. Waters, Ellicott City, all of Md.

[73] Assignee: W. R. Grace & Co.-Conn., New York, N.Y.

[21] Appl. No.: 812,163

[22] Filed: Dec. 23, 1985

Related U.S. Application Data

[63] Continuation of Ser. No. 647,177, Sep. 4, 1984, abandoned, and a continuation of Ser. No. 646,977, Sep. 4, 1984, abandoned.

[51] Int. Cl.$^4$ .................... C01B 33/28; C01B 33/113
[52] U.S. Cl. ................... 423/328; 423/329; 423/330; 423/338; 423/339; 502/65; 502/68; 502/69; 502/71
[58] Field of Search .................... 423/328 T, 329, 328, 423/326, 330, 338, 339, 329 T, 328 C; 502/65, 68, 69, 71

[56] References Cited

U.S. PATENT DOCUMENTS

| | | | |
|---|---|---|---|
| 3,702,886 | 11/1972 | Argauer et al. | 423/328 |
| 3,926,782 | 12/1975 | Plank et al. | 208/135 |
| 3,941,871 | 3/1976 | Dwyer et al. | 423/328 |
| 4,041,135 | 8/1977 | Williams et al. | 425/329 |
| 4,061,724 | 12/1977 | Grose et al. | 423/325 |
| 4,151,189 | 4/1979 | Rubin et al. | 423/329 |
| 4,175,114 | 11/1979 | Plank et al. | 423/329 |
| 4,199,556 | 4/1980 | Plank et al. | 423/329 |
| 4,203,869 | 5/1980 | Rollmann | 423/329 |
| 4,257,885 | 3/1981 | Grose et al. | 423/328 |
| 4,275,047 | 6/1981 | Whittam | 423/329 |
| 4,326,994 | 4/1982 | Haag et al. | |
| 4,341,748 | 7/1982 | Plank et al. | 423/328 |
| 4,431,621 | 2/1984 | Taramasso et al. | 423/329 |
| 4,441,991 | 4/1984 | Dwyer et al. | 208/111 |
| 4,495,166 | 1/1985 | Calvert et al. | 423/329 |

FOREIGN PATENT DOCUMENTS

| | | |
|---|---|---|
| 0042225 | 12/1981 | European Pat. Off. ............ 423/329 |
| 306238 | 8/1988 | European Pat. Off. . |
| 0207186 | 2/1984 | Fed. Rep. of Germany . |
| 1115489 | 5/1968 | United Kingdom ............... 423/329 |
| 80-2020 | 10/1980 | World Int. Prop. O. . |

OTHER PUBLICATIONS

János B. Nagy et al., "Position and Configuration of the Guest Organic Molecules within the Framework of ZSM-5 and ZSM-11 Zeolites" *Zeolites* vol. 3, No. 1, Jan. 1983 pp. 43–49.

Jacek-Klinowski et al., "High Resolution Solid-State n.m.r. Studies of temperature-induced Phase Transitions in Silicalite" (Zeolite-ASM-5), *Zeolites* vol. 7, No. 7, Jan. 1987 pp. 73–78.

Olson et al., "Chemical and Physical Properties of the ASM-5 Substitutional Series", *J. Catalysis*, vol. 61, pp. 390–396, 1980.

Girrbach; "Anwendung der Thermischen Analyze zur Untersuchung von ZSM-5-Zeolithen." CLB Chemie Fur Labor und Betrieb.

Asomuza, "Analisis Jermico De Zeolitas Ricas en Silice." Proceedings of 11th Ibero-American Symposium on Catalysis.

Derouane, E. G. et al., "Synthesis and Characterization of ZSM-5 Type Zeolites I. Physico-Chemical Properties of Precursors and Intermediates" Applied Catalyst, 1 (1981) 201–224.

*Primary Examiner*—Jeffrey Edwin Russel
*Attorney, Agent, or Firm*—Edward J. Cabic

[57] ABSTRACT

ZSM-5 crystallites are produced with very low levels of blocking tetrapropyl ammonium ions (Q). The reaction mixture contains sources of silica, soda, alumina and trace amounts of Q ions as nucleation agents. Because the crystallites as synthesized from the aqueous medium exhibit only a very small fraction of blocking cations, there is always a diffusion path for the hydrated sodium ions to be exchanged without the need of prior removal of the blocking cations by calcination or otherwise. The small size crystallites can be exchanged, blended with other materials, and formed into catalyst particles. The silica to alumina ratio can be varied and when no aluminum is added, silicalite may be formed. The synthesis can be done in 24 hours or less.

43 Claims, No Drawings

PROCESS FOR MAKING CRYSTALLINE SILICEOUS MATERIALS

CROSS-REFERENCE TO RELATED APPLICATIONS

This application is a continuation of U.S. application Ser. No. 647,177 filed Sept. 4, 1984 and U.S. application Ser. No. 646,977 filed Sept. 4, 1984, both now abandoned.

FIELD OF THE INVENTION

This invention relates to a process to make small crystallites of the zeolite ZSM-5 which can be directly ion exchanged without requiring calcination of the as crystallized product.

BACKGROUND OF THE INVENTION

The synthetic zeolite ZSM-5 has been described by Argauer et al in U.S. Pat. No. 3,702,886 and by many others since 1972. ZSM-5 is a zeolite which crystallizes in the orthorhombic system with unit cell dimensions of about:

$a_0 = 20.1$ Angstrom units
$b_0 = 19.8$ Angstrom units, and
$c_0 = 13.4$ Angstrom units The unit cell contains 96 atoms of silicon and aluminum, each tetrahedrally coordinated with oxygen which are often referred to as silicon and aluminum tetrahedrons (also silica and alumina tetrahedrons). As pointed out in the basic Argauer et al patent, silicon can be replaced with germanium and aluminum can be replaced with gallium to still obtain ZSM-5. As used herein the term silica is to include germania and mixtures of germania and silica and the term alumina is to include gallia and mixtures of gallia and alumina. The proportion of silicon to aluminum may vary depending on composition. For example, a ZSM-5 product with a $SiO_2$ to $Al_2O_3$ mole ratio of 46:1 will contain, on average, 92 silicon and 4 aluminum tetrahedrons per unit cell. These tetrahedrons form a rigid covalent framework. The zeolite may contain other substances or ions which are not part of the framework. For example, it may include cations, water, organic molecules, hydroxyl ions or gases. These substances are present in the pores within the crystal structure. ZSM-5 crystals are traversed by two sets of channels or pores. A set of essentially straight pores which run parallel to the "b" axis and a set of pores which zigzag or undulate in the direction parallel to the "a" axis. The two sets of pores or channels intersect on a regular and repetitive manner such that each unit cell includes four such intersections.

Thus, a typical unit cell can be represented in simple terms by the following symbolic notation:

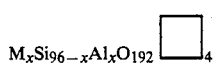   Formula (1)

$M_xSi_{96-x}Al_xO_{192}$ ⬜₄ in which

M represents monovalent cations such as alkali metals, organic bases, or $H^+$.

⬜ represents the pore intersections, and the other symbols have their usual chemical meaning.

Note that the summation of silicon and aluminum equals 96 (the number of tetrahedrons per unit cell) and that the number of monovalent cations equals the number of aluminum atoms.

One can further refine the symbolic representation of a typical unit cell by indicating the presence of organic bases such as, for example, normal tetrapropyl ammonium ion $[(n-C_3H_7)_4N]^+$ hereinafter designated by the letter Q, which, because of its size and shape, is centered in the intersections unable to move within the rigid framework and, therefore, blocking diffusion or flow of other molecular species or ions.

The representation takes the following form:

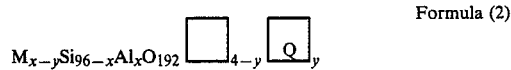   Formula (2)

$M_{x-y}Si_{96-x}Al_xO_{192}$ ⬜₄₋ᵧ $\boxed{Q}_y$ in which

⬜ represents the "open" intersections which are either empty or filled with small molecules or ions which are capable of and allow diffusion or flow through the channels and intersections, and $\boxed{Q}$ represents those intersections which are occupied by large, fixed ions such as tetrapropyl ammonium (represented by Q) which block diffusion and flow through those intersections. Note that the summation of "open" and blocked intersections is four.

Although Formula (2) does not include all of the components of the ZSM-5 zeolite in each and every of its possible forms, it includes all of its key functional components. Formula (2) provides the following important information:

the silica to alumina mole ratio: $R = 2(96-x)/x$,
the number of blocking templates per unit cell: y,
the number of intersections per unit cell: 4,
the fraction of blocked pore intersections:

$$f = \frac{y}{4},$$

the particular cationic form ($Na^+$, $NH_4^+$, $H^+$, etc.) of the zeolite,
the electrical neutrality of the system, and
a general basis to define stoichiometric proportions in a ZSM-5 product.

Under this notation x indicates the number of aluminum atoms in the unit cell and thus there will be 96-x silicon atoms since the total of these two elements is 96. There are 4 intersections for each unit cell which are represented by the 2 boxes. The one on the far right represents the number of intersections, (y), filled with Q ions, and the other box represents the remaining intersections which do not contain Q ions and they number 4-y. Electrical charge neutrality is maintained since the number of monovalent cations equals the number of aluminum atoms in the structure.

The $SiO_2$ to $Al_2O_3$ mole ratio in ZSM-5 can be varied and ZSM-5 zeolites have been made with very large $SiO_2$ to $Al_2O_3$ mole ratios. Dwyer et al in U.S. Pat. No. 4,441,991 refer to high ratio zeolites disclosed in U.S. Pat. No. Re. 29,948 and equivalents of such zeolites, e.g., silicalite disclosed in U.S. Pat. No. 4,061,724. Dwyer et al indicate the equivalency of these two zeolites is known in the art, as discussed, for example, by Fyfe et al, in *Resolving Crystallographically Distinct Tetrahedral Sites in Silicalite and ZSM-5 by Solid State NMR,* 296 Nature 530 (Apr. 8, 1982), by Rees in *When is a Zeolite Not a Zeolite,* 296 Nature 491 (Apr. 8, 1982), and by Bibby et al., in *Silicalite-2, a Silica Analogue of the*

*Aluminosilicate Zeolite ZSM*-11, 280 Nature 664 (Aug. 23, 1979). As used herein- the term ZSM-5 zeolite also includes silicalite.

In the classical synthesis of ZSM-5, following the teachings of the Plank et al patent (U.S. Pat. No. 3,926,782), tetrapropylammonium ion (Q) is used as a template. Crystallization of the silica and alumina tetrahedrons takes place around the Q ions which end up occluded at the intersections of the two sets of pores. The Plank et al synthesis requires the use of large excess of Q ions in relation to the number of intersections in the resulting ZSM-5 structure. As a result, a large proportion of the Q employed ends up in solution in the mother liquor following synthesis and the remainder ends up within the crystal structure.

Symbolically the Plank et al product may be represented in its key features by:

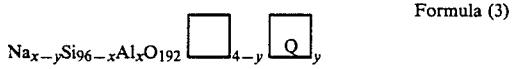

Formula (3)

in which y is nearly 4, and the degree of blocking is essentially complete.

Essentially all substances or ions of appreciable size, such as for example hydrated sodium ions, will be unable to diffuse freely through the structure until the blocking Q ions are removed. Furthermore, the Q ions cannot be easily removed because their size is large, and their fit is very tight. For all practical purposes the Q ions are occluded and fixed. The only practical way to remove the occluded Q ions from the structure is to break down these large cations through pyrolysis at high temperature and/or oxidation. Once the Q has been removed from the structure, the channels and intersections become open to diffusion of molecules or ions of sizes generally below about 5 Angstroms. For example, hydrated sodium ions may easily diffuse through an aqueous medium and be exchanged by other cations such as, for example, ammonium. Since the most common use of ZSM-5 as a catalyst is in the hydrogen form, its preparation will normally require the following sequence of principal steps:

synthesis using organic materials as the templates,
high temperature calcination to remove organic blocking cations such as Q,
exchange of alkali metal ions with ammonium ion, and
decomposition at elevated temperature of the ammonium ion into the hydrogen form of the zeolite and gaseous ammonia.

Attempts have been made to make ZSM-5 with small crystallite sizes. When used as a catalyst in hydrocarbon conversion these small size crystallites retard catalyst aging during the hydrocarbon processing reactions as disclosed by Plank et al in U.S. Pat. No. 3,926,782. The zeolites in the Plank et al patent were made with either relatively large concentrations of tetrapropyl ammonium bromide (QBr) or a tertiary amine and an alkyl halide (such as bromide) which would form a tetra-alkyl ammonium halide such as QBr when using tripropylamine and propylbromide. The disposal of these materials in the waste reactant mixtures presents environmental pollution problems. Furthermore, the zeolite as formed had to be calcined before being ion exchanged. Haag et al in U.S. Pat. No. 4,326,994 also used large concentrations of a polyalkyl amine and an organic halide (which would combine to form a tetra-alkyl ammonium halide such as QBr) to make small crystallites.

Again, it was necessary to calcine the zeolites before they could be exchanged.

In these prior systems using Q ions, the amount of Q employed was very large. For example, in the basic Argauer et al U.S. Pat. No. 3,702,886 the first example uses over 1250% of the amount of Q needed to occupy all intersections on the basis of the unit cell stoichiometry of Formula (2).

ZSM-5 has also been produced from reaction systems containing seeds. Rollmann et al U.S. Pat. No. 4,203,869 disclosed using ZSM-5 crystals as seeds and noted that the successful crystallization required the further presence of Q, the tetrapropylammonium cation. Plank et al in U.S. Pat. No. 4,175,114 used seeds alone or in combination with an alcohol. The alcohols disclosed were aliphatic alcohols and preferably containing 2 to 5 carbon atoms. Illustratively named alcohols were ethanol, propanol, butanol and pentanol. The patentees stated they contemplated that the alcohols could be straight or branched chain. There was no mention of the crystallite size obtained.

ZSM-5 has also been made in a low sodium form so the zeolite need not be ion exchanged prior to use. Rubin et al in U.S. Pat. No. 4,151,189 disclosed using propylamines with stirring to produce a zeolite in the as-synthesized form which had less than 0.14% by weight of alkali metal. There was no discussion of the crystallite size. Plank et al in U.S. Pat. No. 4,341,748 claimed an uncalcined form of ZSM-5 which was capable of substantially complete ion exchange of its original metal cations without prior calcination. The disclosure was a continuation-in-part of the Plank et al U.S. Pat. No. 4,175,114 patent discussed above with regard to seeding and it had the same examples.

ZSM-5 has also been made in reaction systems which do not utilize the large Q ion templates. Taramasso et al in U.S. Pat. No. 4,431,621 disclosed the use of organic substances which contain hydroxyl functions such as alcohols and phenols and more particularly glycols and polyglycols. The patent did not give the crystallite sizes.

OBJECTS OF THE INVENTION

It is an object of this invention to produce ZSM-5 crystallites having a size of their smallest dimension of below about 0.3 micrometer.

It is a further object of this invention to produce very small ZSM-5 crystallites using only small to trace amounts of quaternary ammonium ions as templates or nucleating agents.

It is a further object to modify those known processes for making ZSM-5, which do not use tetrapropyl ammonium ions, by adding a combination of Q ions and other materials to produce ZSM-5 in submicron size crystallites.

It is a further object of this invention to produce ZSM-5 in the as synthesized and washed form which have large blocking organic compounds such as Q present in only a small fraction of the number of intersections in the zeolite structure.

It is a further object of this invention to obtain novel ZSM-5 in the as synthesized and washed form which have large blocking organic compounds such as Q present in only a small fraction of the number of first section; in the zeolite structure.

It is a further object of this invention to produce ZSM-5 having a high degree of crystallinity.

It is a further object of this invention to produce ZSM-5 from raw materials of low cost.

It is a further object of this invention to produce ZSM-5 by a non polluting process.

It is a further object of this invention to produce ZSM-5 by a process having a high equivalent product concentration as will be defined herein.

It is a further object of this invention to produce ZSM-5 by a process utilizing a reactor such as an autoclave with a very large reactor throughput as will be defined herein.

It is a further object of this invention to produce ZSM-5 which can be ion exchanged without requiring a precalcination step.

It is another object of this invention to produce ZSM-5 by using a recycle process.

It is a further object of this invention to produce silicalite and with the same objects as for making ZSM-5.

It is a further object of this invention to produce the intended zeolites by an overall low cost process.

It is a further object of this invention to blend the ZSM-5 obtained with matrix material to form catalyst particles.

These and further objects will become apparent as the description of the invention proceeds.

SUMMARY OF THE INVENTION

This invention relates to a process to synthesize ZSM-5 in an aqueous medium from sources of silica, soda and alumina in a specific concentration reaction mixture with trace amounts of tetrapropyl ammonium (Q) ions as the nucleation agent. Various size crystallites can be produced including novel crystallites having dimensions below about 0.3 micrometer can be produced which have low levels of blocking Q ions present in the as synthesized form. Silicalite is made when the source of alumina is deleted.

This method is called the "Trace Molecular Seeds" process or simply the TMS process because the process uses a far-below-the-stoichiometric amount of QBr as "Trace Molecular Seeds" to begin the nucleation reaction which provides the seeding nuclei for subsequent crystallization growth. Under properly controlled conditions, crystallization proceeds readily without the need of any other templates such as organic substances having hydroxyl groups used in the Taramasso et al U.S. Pat. No. 4,431,621 and it is completed in a matter of several hours. The zeolite products are uniform in the various crystallite sizes obtainable and they contain only a small concentration of Q ions.

The trace amount of QBr employed in the process is a small fraction of the stoichiometric amount of Q ions calculated on the basis of Formula (2) which would occupy all pore intersections within the structure. The amount used is generally less than 20% of the stoichiometric amount based on Formula (2). For example, a product with $SiO_2$ to $Al_2O_3$ mole ratio of 46:1 can be prepared using generally less than 0.40 mole of QBr per mole of $Al_2O_3$ to give a ZSM-5 represented symbolically by:

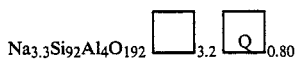

Formula (4)

$Na_{3.3}Si_{92}Al_4O_{192} \square_{3.2} Q_{0.80}$

Because the crystallites as synthesized from the aqueous medium exhibit only small fraction of blocking cations, there is always a diffusion path for the sodium ions to be exchanged without a need of prior removal of the blocking cations by calcination or otherwise. This significantly reduces processing costs and eliminates polluting steps as well. Merely by water washing the zeolite the excess NaOH may be removed from the structure. The degree of removal depends on the extent of washing. Insufficient washing will leave behind non zeolitic alkali metal hydroxide. By contacting the product with a solution of an ammonium salt such as $NH_4NO_3$, the sodium ion is readily exchanged and the zeolite essentially converted to the ammonium form.

By controlling the concentration of QBr used and selecting the right proportion of soda and water in the reaction slurry the TMS process can produce any desired size of zeolite crystallites ranging from submicrometer to over ten micrometers. When the right proportion of soda and water are employed the crystallite size of the zeolite product is generally inversely related to the amount of QBr used in the synthesis.

The present TMS process produces high quality ZSM-5 zeolites of a lower cost than previous processes and it provides a better control of the resulting product properties and quality. Furthermore, the process is nonpolluting. The high equivalent product concentration, which is generally greater than 12% and often greater than 14%, and the short reaction time which takes about 24 to 8 hours or less to complete the ZSM-5 synthesis, combine to give excellent product reactor throughputs.

All of which are significant improvements over prior art. The crystallites can be exchanged, blended with matrix material, and formed into catalyst particles. The silica to alumina ratio can be varied and when no aluminum is added, silicalite may be formed.

DESCRIPTION OF THE PREFERRED EMBODIMENTS

Our new method for synthesizing the zeolite of ZSM-5 is especially suitable for making small size crystallites. As described by Plank et al in U.S. Pat. No. 3,926,782 very small crystallite size ZSM-5 containing catalyst results in the retardation of aging of such catalyst during various hydrocarbon conversion reactions such as upgrading of reformates, transalkylation of aromatic hydrocarbons, alkylation of aromatics, reduction in the pour point of fuel oils and in catalytic cracking of hydrocarbons. When upgrading naphthas or reformates, the use of the small size crystallites has been found by Plank et al not only to retard aging of the catalyst, but also to give rise to improved yield-octane through the use of decreased hydrogen to hydrocarbon ratio while retaining satisfactory aging during naptha or reformate processing.

One simple explanation as to why smaller size particles are advantageous in certain situations concerns the shortened diffusional path and often higher rates of reaction. Furthermore, in catalytic applications where a molecule diffuses into the crystallite and cracks, if there remains an extremely long diffusion path for the cracked products to exit, those products may further crack to form smaller, undesired products before they leave the crystallite.

Our method produces a ZSM-5 zeolite having a $SiO_2$ to $Al_2O_3$ mole ratio R greater than 5, having crystallites ranging from submicrometer to over ten micrometers and preferably having crystallites with their smallest dimension below about 0.3 micrometer and having an average unit cell represented by the formula

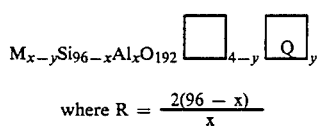

Formula (2)

where $R = \dfrac{2(96 - x)}{x}$

M represents monovalent cations such as alkali metals, organic bases, or $H^+$.

□ represents the intersections of the channels inside the ZSM-5 porous framework free of tetrapropyl ammonium ions, and $\boxed{Q}$ represents the intersections of the channels inside the ZSM-5 porous framework having occluded tetrapropyl ammonium ions The method uses a mixture containing a source of silica, a source of alumina, a source of sodium hydroxide, water and a small amount of tetrapropyl ammonium ions. The amount of tetrapropyl ammonium ions in the reaction mixture is such that it is at least an effective amount and in an amount expressed in moles less than 1/120 of the sum of the number of moles of Si in the reaction mixture multiplied by 0.8 and the number of moles of Al in the reaction mixture. After the mixture is reacted in a heated reactor such as an autoclave, the ZSM-5 zeolite product is recovered. When the source of alumina is omitted, then silicalite is formed.

The ZSM-5 zeolite obtained as synthesized has a small amount of Q ions in the intersections. In Formula (2) above the maximum value of y is 0.8 which corresponds to 20% of the theoretical stoichiometric amount. A more preferred value has y less than 0.6 and more preferably y is less than 0.4. At these concentrations, essentially all of the Q in the reaction mixture is deposited in the zeolite produced. In contrast to the small amounts of Q used in the present process all of the examples of the basic Argauer et al patent utilize more than 870% of the stoichiometric amount of Q which is about 44 times the upper limit of our process. With regard to our preferred upper limit of y=0.4, Argauer et al use more than 88 times that amount in each of their six synthesis examples (Nos. 1–6).

The process according to the present invention produces ZSM-5 having a high degree of crystallinity, an occluded carbon content as prepared and water washed of less than 0.1 mole of carbon per mole of total silicon and aluminum contained in the ZSM-5, a zeolitic alkali metal content as prepared and water washed of less than one mole per mole of contained aluminum, a high degree of crystalline purity exhibiting a single crystalline phase material, an aluminosilicate or silicalite structure, the capacity to be readily exchangeable without prior removal of Q ions, and containing as prepared and water washed less than 1/120 mole of nitrogen per mole of total silicon and aluminum contained in the ZSM-5.

The ZSM-5 zeolite obtained after being water washed will normally have Na as M in Formula (2). This product can be further ammonium ion exchanged so that M becomes $NH_4^+$. It is also possible to at least partially exchange the as washed product with an equivalent amount of lanthanide ion. By lanthanide ion we mean the cations of all those elements having an atomic number of 57–71 inclusive plus the element yttrium.

The reaction slurries used in the present process have the molar ratios of ingredients set forth in Table 1.

TABLE 1

|  | Broad | Preferred | Particularly Preferred |
|---|---|---|---|
| $SiO_2$ to $Al_2O_3$ | greater than 6 | 20–120 | 40–80 |
| $H_2O$ to $OH^-$ | 20–120 | 30–100 | 50–70 |
| (Si + Al) to $H_2O$ | 0.03–0.15 | 0.05–0.12 | 0.06–0.09 |
| Q to U | less than 0.8 | less than 0.6 | less than 0.4 |
| Reaction Temp. (°C.) | 100–280 | 140–230 | 170–190 |
| Reaction Time (hrs.) | less than 24 | less than 12 | less than 8 |

The amount of $OH^-$ expressed above in moles is the sum of the moles of free alkali metal hydroxide and the moles of free tetrapropylammonium hydroxide. The term U is 1/96 of the sum of the number of moles of Si in the reacting mixture multiplied by 0.8 plus the number of moles of Al in the resulting mixture.

ZSM-5 zeolites can be produced from reactant slurries where the mole ratio of $SiO_2$ to $Al_2O_3$ can vary from about 5 up to any higher value. The desired mole ratio of silica to alumina in the ZSM-5 product is controlled by the amount of silica and alumina added to the reaction mixture. If the silica to alumina ratio is greater than 6, then a product is obtained having a silica to alumina ratio greater than 5. In the absence of alumina the product silicalite is obtained. Preferred silica to alumina ratios range from between 10 to 120 with a more preferred ratio range being about 40 to 80. In general, essentially all of the alumina used in the reaction mixture ends up in the product zeolite. This is not the case with the silica. Because of the high alkalinity of the reaction system some of the silica remains in solution in the mother liquor. The specific proportion varies depending on the specific mixtures and conditions used. In the $SiO_2$ to $Al_2O_3$ mole ratio range of about 20 to about 120, approximately 80±15% of the silica enters the product zeolite.

The crystallite size of the zeolite products made by the TMS process is controllable. By controlling the amount of QBr used in the reaction slurry, zeolite crystallites are formed with sizes ranging from submicrometer to about ten micrometers depending on the specific applications intended for the zeolites. Although the amount of QBr used in each synthesis is very small, it still may effectively control the crystallite size of the final product. In combination with proper control of other variables the TMS process produces a uniform size distribution.

Generally, the crystallite size in a given synthesis is inversely related to the concentration of QBr used. For example, in a well prepared reaction slurry, where a relatively large amount of QBr is used, more nuclei are generated, and, therefore, smaller size ZSM-5 crystallites are obtained. On the other hand, if a relatively small amount of QBr is used in the same reaction slurry, less nuclei are generated and, therefore, larger size ZSM-5 crystallites are obtained. In either case, however, the amount of QBr used is extremely small.

There is no need for large amounts of the tetrapropyl ammonium ion template when making ZSM-5 according to the present invention. In fact, large relative amounts of Q are undesirable because these large cations end up within the structure and block diffusion through the pores. The resulting zeolite product would then require calcination before the sodium form of the zeolite could be ion exchanged to the ammonium and eventually the hydrogen form for catalytic applications.

The upper limit for the amount of Q ions in the reaction slurry or mix can be specified in terms of the number of moles of Si and the number of moles of Al in the reaction slurry. We define U as 1/96 of the sum of the number of moles of Si in the reaction mixture multiplied by 0.8 plus the number of moles of Al in the reaction mixture. On this basis the number of moles of tetrapropyl ammonium halide or hydroxide used in a reaction slurry to provide the Q ions is less than 0.8U for the broad range, less than 0.6U for the preferred range, and less than 0.4U for the most preferred range. For reaction slurry with a silica to alumina ratio R of greater than 5, the maximum Q to silica mole ratio is less than 0.01108. For an R of 20, the maximum Q to silica mole ratio is 0.00871 and for producing silicalite the maximum Q to silica mole ratio is 0.00792.

For a reaction slurry made up of

60 $SiO_2$: 1 $Al_2O_3$: 6 $Na_2O$: 800 $H_2O$: 0.155 QBr the amount of QBr is only about 7.4% of the stoichiometric amount of Q needed to fill up all of the intersections of the channels of the resulting zeolite. In other words, over 92% of the pore intersections in the structure are available for diffusion since they are not blocked. It is possible to use even larger amounts of Q. In a reaction slurry with a composition such as:

60 $SiO_2$: 1 $Al_2O_3$: 6 $Na_2O$: 800 $H_2O$: 0.31 QBr the amount of QBr employed is about 15% of the stoichiometric amount of QBr needed to block all intersections in the resulting zeolite. Even this larger concentration of QBr, does not impair the subsequent ion-exchange step where practically all of the sodium ions inside the as-synthesized product can be removed. It should be noted that about 85% of the pore intersections are still available to diffusion. After ion-exchange, the $Na_2O$ content is reduced to the level of about 0.15% or less which is not detrimental to the catalytic activity of the product.

The size of the ZSM-5 crystallite is further controlled by selecting the proper combination of soda and water concentrations. The concentration of reactive soda at any time is indirectly measured by the pH. Adding too much soda will cause large particles to be formed. For example, in a 60 $SiO_2$ to 1 $Al_2O_3$ system having greater than 10 moles of $Na_2O$ per mole of $Al_2O_3$ will result in large size crystallites. If the solids content is increased by reducing the amount of water, large crystallites will also be produced. For example, in a 60 $SiO_2$ to 1 $Al_2O_3$ system, when the amount of water is reduced from 800 moles of water for each mole of $Al_2O_3$ to 600 moles of water, the crystallite size increases.

The synthesis temperature also has an effect on the size of the ZSM-5 crystallites. The synthesis time varies inversely with temperatures in the range from about 100° to 280° C. with the optimal temperature for making small crystallites being about 170°-190° C. If the reaction temperature is increased, the size of the crystallites will generally increase.

Our preferred method to prepare the reaction slurry and to ensure homogeneous mixing is to first dilute the silica source (such as Ludox) with about one-third of the required de-ionized water. The QBr is mixed with another one-third of the de-ionized water and this mixture is poured into the dilute silica product. The remaining water is mixed together with sodium hydroxide and sodium aluminate. It is noted that sodium hydroxide is miscible with sodium aluminate and no gel formation occurs upon mixing. Finally, the diluted sodium aluminate is mixed into the diluted Ludox and QBr solution, and a gel slurry immediately forms. After being hand stirred, the gel slurry forms a smooth reaction paste which is ready for heating in a stirred autoclave.

Alternatively, since the QBr crystals are normally first dissolved in water, a stock QBr solution can be made by dissolving, for example, 25 g QBr crystals in about 2000 g water. Then a measured amount of the stock QBr solution can be weighed out and mixed with the Ludox or other silica compounds as described above.

The reaction slurry is then subjected to hydrothermal conditions. The temperature of the synthesis in accordance with the TMS process varies from 100° to 280° C., but preferably from 140° to 230° C., and most preferably from about 170°-190° C. The synthesis time also varies depending upon the reaction temperature, the proportion of silica to alumina, the pH, and other parameters of the reaction system, etc. It can take 2 to hundreds of hours to complete a synthesis. For example, at 175° C. the TMS process takes about 8 hours in a stirred autoclave. It will take a longer time in a static autoclave, and still longer time in a reflux system at boiling temperature to produce the desired zeolite.

At 200° C., the reaction slurry is converted into the zeolite product in about 4 hours. The crystallite size of the final product is comparable to that which is produced at 175° C. in 8 hours. However, at higher temperatures, the reaction slurry tends to generate larger crystallites despite the fact that the synthesis time may be further reduced.

The ZSM-5 can also be produced using a recycle of mother liquor to avoid waste of valuable $SiO_2$ and $Na_2O$. As mentioned earlier, although essentially all of the Q ion and all of the alumina charged to the reaction mixture end up in the product, the silica only reacts partially and the soda and water remain in excess. A good portion of this mother liquor containing silica and soda can readily be separated from the product and recovered by filtration. When using the mother liquor to make a new synthesis slurry a full complement of alumina and QBr are added but only a fraction of the original amounts of silica and sodium hydroxide need be added. The composition of the resulting recycle slurry is the same as the composition of the initial slurry. If a different starting slurry composition is desired, this can also be achieved using the recycled mother liquor. The recycle scheme may be repeated numerous times without detriment to the properties and quality (including crystallite size) of the resulting product. As shown in Example 18 numerous recycle runs can be used with by-product mother liquor to produce ZSM-5 of high quality and of very small crystallite size using only trace amounts of QBr.

The TMS process is significantly different from the basic Argauer et al process which uses much larger amounts of QBr. As shown in Table 1, the TMS process uses a very small amount of QBr which expressed in moles is less than 0.8U where U is 1/96 of the sum of the number of moles of Si in the reacting mixture multiplied by 0.8 plus the number of moles of Al in the resulting mixture. In contrast the Argauer et al process (U.S. Pat. No. 3,702,886) uses large excess of QBr as templates over the stoichiometric amount of formula (2) which has been shown to be 4 molecules of QBr per unit cell of product. As a result, the product obtained in the Argauer et al ZSM-5 patent is occluded with Q ions and cannot be ion exchanged without a prior step to remove the blocking Q ions. Although the exact mechanism of crystallization is not known, we believe the use of the trace amount of QBr effectively begins the structuring of silicon and aluminum tetrahedrons around it and provides nuclei for subsequent crystallization without the use of additional Q ions as templates. We consider the Q ion as being an effective template material capable of directing the silica and alumina tetrahedrons into the ZSM-5 structure under hydrothermal conditions.

The characterization of the ZSM-5 product for crystalline purity and degree of crystallinity was carried out using standard x-ray diffraction methods by using a Norelco X-Ray Diffractometer manufactured by Philips Electronics, Inc. (Model 12045B/3).

A powder x-ray diffraction pattern was obtained under standardized conditions which include the packing of the zeolite product and the settings of the instrument controls. The pattern was examined qualitatively and quantitatively. The qualitative examination included establishing the presence of all the characteristic diffraction lines of ZSM-5 as defined by Argauer et al in U.S. Pat. No. 3,702,886. ZSM-5 was considered the product made when all of the key diffraction lines were found in our product and no extraneous lines were observed. The absence of foreign x-ray diffraction lines was considered indicative of crystalline purity.

The quantitative characterization of our product was made by comparing the peak height of the strongest diffraction line which occurs at a d-spacing of 3.85±0.07 Angstrom units with the corresponding peak height of a reference ZSM-5 material prepared by the Argauer et al patent. The ratio of the peak height of our material to the peak height of the reference material times 100 was taken as the % crystallinity of our material. Within the experimental error of this method, the reference material had as large a peak height as any ZSM-5 material examined over several years of research. Therefore, that material was assigned 100% crystallinity. Although the method used is convenient and provides a quick and practical determination of the degree of crystallinity, it is not exact and may have an error of up to ±20% of the value determined depending on several factors. For example, very small crystallites tend to give somewhat wide diffraction peaks which often results in smaller peak heights.

A further advantage of the present process is its very high reaction throughput which is possible because of the high equivalent product concentration in the reaction slurry coupled with the relatively short reaction time. The ZSM-5 zeolites readily form in the autoclave at temperatures of about 175° C. in less than 8 hours.

The equivalent product concentration in the reaction slurry may be calculated after the reaction is completed and is expressed as the weight percent of ZSM-5 in the sodium form on a dry basis obtained from a reaction slurry. It is equal to 100 times the summation of the weight of $SiO_2$, $Al_2O_3$, and equivalent $Na_2O$ in the zeolite product divided by the weight of the initial reaction slurry.

The reactor (autoclave) throughput is the weight of product prepared per unit of reactor (autoclave) volume per unit time. It is a very important parameter since it measures the productivity rate through the most capital intensive unit operation in the process, namely, the autoclaving step. The reactor (autoclave) throughput, or simply the throughput, may be expressed in various units. We shall use the following units and specific definition to describe our process:

Throughput is the weight in kilograms of the ZSM-5 product obtained, expressed on a dry basis and normalized to the pure sodium form, per cubic meter of reactor (autoclave) volume per day.

For example, the "throughput" in an autoclaving step in which 360 grams of equivalent dry basis sodium ZSM-5 is obtained in an autoclaving step lasting 6 hours in an autoclave volume of 2400 cm³ will be:

$$\frac{360 \text{ g} \times 10^{-3} \text{ Kg/g} \times 10^6 \text{ cm}^3/\text{m}^3 \times 24 \text{ hours/day}}{2400 \text{ cm}^3 \times 6 \text{ hours}} =$$

$$600 \text{ Kg/m}^3/\text{day}$$

The scanning electron microscope is used to secure scanning electron micrographs (SEM) of the ZSM-5 zeolite product with magnifications in the range of from about 1,000 to about 100,000. Submicron crystallites of ZSM-5 products are clearly photographed and measured by SEM in 10,000-times magnification and greater.

The sources for the major reactants used in our synthesis of ZSM-5 zeolites are given below.

The source of silica used in the synthesis can be silica gel or silica hydrogel manufactured by Davison Chemical Co., a division of W. R. Grace & Co.; another type of silica gel is Hi-Sil manufactured by Pittsburgh Plate Glass; Ludox, a colloidal silica sol manufactured by Dupont; fumed silica such as Cabosil manufactured by Cabot Corp., another type of fume silica is the by-product of the ferro-silicon industry which is widely available in industry; sodium silicate which is known as waterglass and is readily available commercially (it may also be a source of soda); and any other form of reactive silica.

Sodium hydroxide is a source of soda and it is also a commodity chemical which is commercially available.

Sodium silicate or water glass is often used as a source of soda and silica.

The source of alumina can be sodium aluminate, aluminum sulfate, or any other form of reactive alumina.

The source of tetrapropylammonium cations can be tetrapropylammonium halides such as the bromide or tetrapropylammonium hydroxide which are available from Eastman Kodak Co. and other companies or in the case of the halide which may be the resulting product of the reaction of a propyl halide and tripropylamine.

The ZSM-5 made by the present process can be directly used to make a catalyst. The reaction slurry made according to the present invention is heated at a temperature of from about 100°–280° C. for less than 24 hours to produce a ZSM-5 zeolite and a mother liquor. The reaction materials are cooled and filtered to obtain the zeolite reaction product. The filtered zeolite is washed and cation exchanged. The exchange may be made with $NH_4^+$, $H^+$, lanthanide or other desired cations as well as with mixtures of these. The exchanged zeolite is blended with a matrix material and formed into a particle. The formed particle is dried and calcined to yield a ZSM-5 zeolite containing catalyst.

Having described the basic aspects of our invention, the following examples are given to illustrate specific embodiments thereof.

EXAMPLE 1

This example illustrates the synthesis of zeolite ZSM-5 using a small amount of Q according to the present invention.

A Ludox and QBr mixture was formed by mixing together 425.8 g Ludox HS-40 (39.8% SiO$_2$, 60.2% H$_2$O), 44 g H$_2$O and 300 g QBr solution (1.3% QBr, 98.7% H$_2$O). Then a second mixture was formed by mixing together 24.0 g sodium aluminate (20.0% Al$_2$O$_3$, 17.0% Na$_2$O, 63.0% H$_2$O), 34.6 g sodium hydroxide (38.7% Na$_2$O, 61.3% H$_2$O) and 44.7 g H$_2$O. The second mixture was added to the Ludox and QBr mixture and hand stirred to form the reaction slurry. The reaction slurry (873.1 g) was charged into a stirred autoclave for synthesis. Heat was applied to the autoclave until it reached about 175° C. which took under 0.5 hour. The temperature was then maintained for 7.5 hours at about 175° C. The resultant product was cooled to room temperature, removed, filtered, washed using 1 liter of warm deionized water and dried overnight at 120° C.

A portion of this product was subjected to powder x-ray diffraction analysis and found to be pure ZSM-5 crystals with 89% degree of crystallinity. The sample was examined by SEM and found to consist of small aggregates of crystallites of about 0.05 micrometer. Chemical analysis showed 91.59% SiO$_2$, 3.18% Al$_3$O$_3$, 4.04% Na$_2$O and 1.39% C. The composition of the product expressed in terms of one unit cell was calculated to be about:

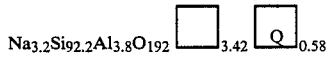

Na$_{3.2}$Si$_{92.2}$Al$_{3.8}$O$_{192}$ [ ]$_{3.42}$ [Q]$_{0.58}$

Obviously the sodium, which calculates to 7.9 atoms per equivalent unit cell, which is in excess over the concentration of zeolitic sodium per unit cell (3.2) was not fully washed and it remained as NaOH in the pores. In spite of the high level of sodium ion present in the product a portion of the product was directly ion-exchanged with 2% NH$_4$NO$_3$ solution, followed by a warm water wash and dried at 120° C. The resulting exchanged zeolite contained only 0.14% Na$_2$O by weight which indicates the fact that the presence of that level of Q ions did not impede an effective exchange into a useful material.

EXAMPLE 2

Example 2 was carried out exactly as Example 1 except that the amount of QBr solution used was reduced to 150 g from 300 g. In order to maintain the amount of water equal to that used in Example 1, an additional 150 g of water was used in this experiment. The weight of slurry prepared was again 873.1 g. The density of the slurry was about 1.15 g/cm$^3$ and its volume was about 759 cm$^3$. After discharging from the autoclave and water washing, the zeolite product was dried overnight at 120° C. The dried product weight 136.8 g. From this value the equivalent product concentration was calculated to be about 15.6%. The autoclave throughput was calculated to have been about 540 Kg/m$^3$/day X-ray diffraction analysis showed the product to be pure ZSM-5 with a degree of crystallinity of about 89%. SEM examination revealed small aggregates consisting of crystallites of about 0.1 micrometer in size. Chemical analyses on a dry basis gave 3.74 wt. % Al$_3$O$_3$, 3.20 wt. % Na$_2$O and 93.06 wt. % SiO$_2$ (by difference). The carbon content was 0.79 wt. %.

The composition of the zeolite expressed in terms of one unit cell calculated from the analyses was:

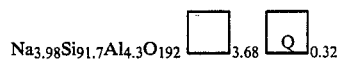

Na$_{3.98}$Si$_{91.7}$Al$_{4.3}$O$_{192}$ [ ]$_{3.68}$ [Q]$_{0.32}$

The excess sodium over the amount shown for the unit cell corresponded to non-zeolitic NaOH present in the pores in an amount of about 2.1 molecules of NaOH per unit cell. This non-zeolitic sodium was the result of insufficient water washing.

It is noteworthy to point out that the amount of carbon contained in the sample was within normal analytical experimental errors equal to the weight of carbon contained in the amount of Q used in the raction (1.08 vs. 1.06 g). In other words, the Q ion was quantitatively occluded within the zeolite structure. In the case of the aluminum, the amount calculated basis the analysis and sample weight was slightly in excess over that actually charged to the reaction slurry (5.1 vs. 4.8 g). Again, analytical error accounts for the small difference. Overall, it is readily apparent that the aluminum used reacts quantitatively and becomes part of the zeolite. Direct exchange of the sodium zeolite with a 2% NH$_4$NO$_3$ aqueous solution gave a product which analyzed 0.04 weight percent Na$_2$O. Again, it is seen that the exchange proceeded efficiently in spite of the presence of trace concentrations of Q ions. Furthermore, the excess sodium resulting from insufficient washing was fully removed.

The exchanged product may be represented by the following symbolic average unit cell:

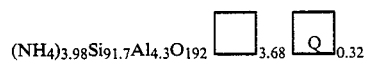

(NH$_4$)$_{3.98}$Si$_{91.7}$Al$_{4.3}$O$_{192}$ [ ]$_{3.68}$ [Q]$_{0.32}$ which upon calcination in air, say at 1000° F. for 3 hours, would convert to:

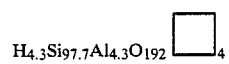

H$_{4.3}$Si$_{97.7}$Al$_{4.3}$O$_{192}$ [ ]$_4$

This example demonstrates the effectiveness of the TMS process to prepare excellent quality ZSM-5 of very small crystallite size in the hydrogen form, ready for catalytic applications, using only trace concentrations of Q ions by a practical non-polluting process requiring no calcination prior to NH$_4^+$ exchange at a high rate or reactor throughput using inexpensive raw materials.

EXAMPLES 3-9

Examples 3 through 9 coupled with Examples 1 and 2 illustrate the increase in crystallite size as the concentration of QBr used is decreased.

The procedure of Example 1 was followed using various amounts of the QBr solution. The amount of water in each experiment was changed to compensate for the change in the amount of water added with the QBr solution.

Table 2 gives pertinent details on this group of experiments.

TABLE 2

Slurry Composition (moles): 60 $SiO_2$: $Al_2O_3$: 6 $Na_2O$: 800 $H_2O$: q QBr

| | Example No. | | | | | | | | |
|---|---|---|---|---|---|---|---|---|---|
| | 1 | 2 | 3 | 4 | 5 | 6 | 7 | 8 | 9 |
| Millimoles of QBr per mole of $Al_2O_3$ | 312 | 156 | 77.9 | 51.9 | 31.2 | 10.4 | 5.2 | 1.25 | 0.52 |
| % Crystallinity | 89 | 89 | 92 | 94 | 92 | 95 | 95 | 98 | 99.5 |
| Approximate value of "y" in formula (2) | 0.6 | 0.3 | 0.2 | 0.1 | 0.06 | 0.02 | 0.01 | 0.003 | 0.001 |
| Approximate size of crystallites (μm) | 0.05 | 0.1 | 0.15 | 0.2 | 0.3 | 0.6 | 0.7 | 1.5 | 2 |
| wt. % $Na_2O$ after exchange with $NH_4^+$ | 0.14 | 0.04 | 0.09 | 0.11 | 0.03 | 0.05 | 0.05 | 0.04 | — |

The results presented in Table 2 show that as the amount of QBr is reduced, the size of the ZSM-5 crystallite significantly increases. The maximum QBr in the reaction slurry is 0.312 moles. This corresponds to a mole ratio of Q to $SiO_2$ in the reaction slurry of 0.312 to 60 which is 0.0052. For Examples 2–6 the mole ratios of Q to $SiO_2$ in the reaction slurry are 0.0026, 0.0013, 0.00087, 0.00052 and 0.00017 respectively. The lowest crystallinity value of 89% in Example 1 can have a error of ±20% such that the lowest value is greater than 71%.

EXAMPLE 10

In order to complete this series in Table 2 of Examples 1–9 an identical preparation was made except that no QBr whatsoever was used. The resulting product after autoclaving, washing and drying exhibited only a suggestion of ZSM-5 crystallinity. SEM examination revealed that the morphology of the resulting product particles was indicative of amorphous materials with large non uniform irregular shapes.

EXAMPLE 11–13

These examples illustrate the results obtained when the reaction temperature was varied.

Reaction slurries were prepared according to Example 2. The reaction temperatures were increased to 200° C. for Example 11, 220° C. for Example 12 and 240° C. for Example 13. The reaction times were shortened from 8 hours for Example 2 to 4, 3 and 2.5 hours respectively for Examples 11 through 13. The results obtained are set forth in Table 3.

TABLE 3

| | Example | | |
|---|---|---|---|
| | 11 | 12 | 13 |
| Temperature, °C. | 200 | 220 | 240 |
| Reaction Time (hrs) | 4 | 3 | 2.5 |
| Approximate crystallite size, micrometer | 0.3 | 0.6 | 1.0 |

By increasing the reaction temperature the reaction times are decreased and the size of the crystallites are increased.

EXAMPLES 15–17

These examples illustrate the production of various ZSM-5 zeolites using reaction slurries having different reactant ratios.

The procedure of Example 2 was followed to obtain reaction slurries having mole ratios of

| Ex. 15 | 20 $SiO_2$: 1 $Al_2O_3$: 2 $Na_2O$: | 267 $H_2O$: 0.05 QBr |
|---|---|---|
| Ex. 16 | 30 $SiO_2$: 1 $Al_2O_3$: 2 $Na_2O$: | 400 $H_2O$: 0.08 QBr |

-continued

| Ex. 17 | 120 $SiO_2$: 1 $Al_2O_3$: 2 $Na_2O$: | 1600 $H_2O$: 0.31 QBr |
|---|---|---|

The x-ray diffraction patterns indicated the formation of ZSM-5.

EXAMPLE 18

This example illustrates the capability of our method to recycle mother liquor in the synthesis of ZSM-5 in order to avoid waste of valuable $SiO_2$ and $Na_2O$.

As indicated in Example 2, essentially all of the Q ion and all of the alumina charged to the reaction mixture end up in the product. This is not the case for the silica which only reacts to about 80% of the level used in the reaction mixture, nor the soda. These substances, together with water, constitute the mother liquor which comes out of the autoclave step mixed with the ZSM-5 product. A good portion of this mother liquor can readily be separated from the product by filtration.

The general method used for recycling all or part of the mother liquor is to form a synthesis slurry of the original run composition using smaller amounts of soda and silica since these materials can be supplemented from the mother liquor and a full complement of alumina and QBr but only a fraction of the silica and sodium hydroxide.

The recycle scheme may be repeated numerous times without detriment to the properties and quality (including crystallite size) of the resulting product. The specific details which follow apply to an original run prepared as per the procedure of Example 2 and four consecutive runs in which mother liquor was recycled. After four consecutive successful recycle runs, 496 g of the mother liquor resulting from the fourth recycle run with a pH of 11.5 and a silica content of 6.45% was obtained. A fifth recycle run slurry was prepared by mixing 200 g of the mother liquor with 303 g of HS-40 Ludox. A solution containing 150 g of QBr solution as described in Example 2 and 100 g of mother liquor was added to the Ludox mix. The 5 g of NaOH (50%) and 24 g of sodium aluminate (20% $Al_2O_3$ and 17% $Na_2O$) were mixed and diluted in another 100 g of mother liquor. The second solution was slowly added to the Ludox mix with vigorous stirring to give the final reaction slurry which exhibited a pH of 12.7. The mole ratio of silica to alumina of the slurry was about 52:1. The reaction slurry was processed as per the procedure of Example 2. The weight of ZSM-5 product obtained was 113 g, the powder x-ray diffraction analysis showed pure ZSM-5 of excellent degree of crystallinity and the scanning electron microscope revealed the crystallite size to be about 0.2 micrometer. The chemical analysis of the final product was 2.63% $Na_2O$, 0.92% carbon, 4.09% $Al_2O_3$ and 90.87% $SiO_2$.

This example demonstrates the feasibility of numerous recycle runs using by-product mother liquor to produce ZSM-5 of high quality and of very small crystallite size using only trace amounts of QBr.

As to the overall process of this invention, we emphasize that the equivalent product concentration in the autoclaving step of our process is generally greater than 12% and often greater than 14%. The high concentration and short reaction times combine to give excellent product throughputs typically greater than 400 $Kg/m^3$/day and more preferably greater than 500 $Kg/m^3$/day. The aforementioned characteristics are significant improvements over prior art.

The following Comparison Reference Examples 1 and 2 replicate prior art processes using ethanol alone in place of Q ions and n-propylamine in place of Q ions. In both cases larger size crystallites are obtained

COMPARISON REFERENCE EXAMPLE 1

Plank et al in U.S. Pat. No. 4,175,114 assigned to Mobil disclose in Example 1 using ethanol to produce a ZSM-5 product substantially deficient in an organic ammonium cation. This product can be exchanged directly without any calcination. Example No. 1 was carefully replicated in our laboratories using the same reagents and following the procedures described by Plank et al. except regarding the time of autoclaving. Instead of using the autoclaving time of 24 hours given in the example, the progress of the reaction was followed by x-ray diffraction analysis and the reaction was stopped when the degree of crystallinity was complete. Our replicate required only 17 hours to reach full crystallinity and that is the value reported and the value used to calculate other parameters. Consequently, the values listed in our replicate are either equal to those reported by Plank et al or actually improvements over their teachings. Table 1 sets forth the data given by Plank et al. and the corresponding data obtained in our replicate, as well as significant parameters calculated from the data given. Note the very large size of the ZSM-5 crystals produced by the process of Example 1 of Plank et al.

TABLE 1

| | Plank et al Ex. 1 | |
| --- | --- | --- |
| | Mobil Oil Corp. U.S. Pat. No. 4,175,114 | Our Replicate |
| Example 1 | | |
| Mole Ratio of Mix | | |
| Ethanol | 146 | 146 |
| $Na_2O$ | 8.6 | 8.6 |
| $Al_2O_3$ | 1.0 | 1.0 |
| $SiO_2$ | 94 | 94 |
| $H_2O$ | 3870 | 3870 |
| $Na_2SO_4$ | 19.0 | 19.0 |
| Density of mix prepared ($g/m^3$) | not given | 1.07 |
| Crystallization | | |
| Equipment | stirred | stirred |
| Temp. °F. | 350° F. | 347° F. |
| Time, hrs. | 24 | 17 |
| Product | | |
| X-ray Analysis | ZSM-5 | ZSM-5 |
| Composition, wt. % | | |
| $Na_2$ | 1.62 | 1.62 |
| $Al_2O_3$ | 2.35 | 2.33 |
| $SiO_2$ | 94.5 | 96.1[1] |
| Composition mole Ratio | | |
| $Na_2$ | 1.14 | 1.15 |
| $Al_2O_3$ | 1.00 | 1.00 |
| $SiO_2$ | 68.5 | 70 |
| Other Calculated Parameters[1] | | |
| Weight of mix prepared (g) | 1576 | 1577 |
| Volume of mix prepared ($cm^3$) | 1473 | 1474 |
| Weight of Na-ZSM-5 made (g) | 79.0 | 80.7 |
| Equiv. product conc., % | 5.0 | 5.1 |
| throughput ($Kg/m^3$/day) | 53.6 | 77.3[2] |
| CRYSTALLITE SIZE (micrometer | Not given | very large[3] |

[1] Calculated from the data given in each example.
[2] The higher throughput is the result of the shorter reaction time in our replicate.
[3] SEM showed very well-defined faceted crystals with dimensions as high as 8 micrometers.

The Plank et al process makes crystallites which are much larger than according to the present process. It uses a low equivalent product concentration (about 5.1% vs. about 14 to 16% for ours) and has a low autoclave throughput of about 54 to 78 $Kg/m^3$/day vs. our throughput of greater than 480 $Kg/m^3$/day It employs somewhat costly raw materials. The aforementioned characteristics combined to make a poor product by an expensive, impractical process.

COMPARISON REFERENCE EXAMPLE 2

Rubin et al in U.S. Pat. No. 4,151,189 assigned to Mobil disclose the use of propyl amines such as normal and isopropyl amines as a means to prepare zeolites essentially free of sodium, thus eliminating the precalcination and cation exchange steps.

Example 3 was carefully replicated in our laboratories using the same reagents and following the procedures described by Rubin et al, except for the autoclaving time. Instead of using the autoclaving time of 45 hours given in the example, the progress of the reaction was followed by x-ray diffraction analysis and the reaction was stopped when the degree of crystallinity was complete. Our replicate required only 8 hours to reach full crystallinity and that is the value reported and the value used to calculate other parameters. Consequently, the values listed in our replicate are either equal to those reported by Rubin et al or actually improvements over their teachings.

TABLE 2

| | Rubin et al Ex.3 | |
| --- | --- | --- |
| | U.S. Pat. No. 4,151,189 | Our Replicate |
| Example 3 | | |
| Mix Ratio - Moles | | |
| $Na_2O$ | 8.3 | 8.3 |
| n-propylamine | 18.3 | 18.3 |
| $Na_2SO_4$ | 19.6 | 19.6 |
| $Al_2O_3$ | 1.00 | 1.00 |
| $SiO_3$ | 93.5 | 93.5 |
| $H_2O$ | 3877 | 3877 |
| Density of mix prepared ($g/m^3$) | not given | 1.08 |
| Crystallization under stirred autoclaving | | |
| Temp., °F. | 350 | 347 |
| Time, Hrs. | 45 | 8 |
| Product | ZSM-5 | ZSM-5 |
| Composition | | |
| C, wt. % | 3.36 | 3.53 |
| $Na_2O$, wt. % | 0.02 | 0.14 |
| $Al_2O_3$, wt. % | 2.32 | 2.33 |

TABLE 2-continued

|  | Rubin et al Ex.3 | |
|---|---|---|
|  | U.S. Pat. No. 4,151,189 | Our Replicate |
| $SiO_2$, wt. % | 97.8 | 97.5(1) |
| Composition, Mole Ratio[1] | | |
| $Na_2O$ | 0.009 | 0.060 |
| $Al_2O_3$ | 1.00 | 1.00 |
| $SiO_2$ | 71.5 | 71.0 |
| Other Calculated Parameters[1] | | |
| Weight of mix prepared (g) | 1860 | 1860 |
| Wt. of equiv. Na-ZSM-5 prepared (g) | 103.2 | 102.5 |
| Volume of mix prepared (g) | 1722 | 1722 |
| Equiv. product conc. (%) | 5.55 | 5.51 |
| Autoclave throughput ($Kg/m^3$) | 32 | 179[2] |
| CRYSTALLITE SIZE, (micrometers) | not given | large(3) |

[1]Calculated from data given in each example.
[2]The higher thoughput is the result of the shorter reaction time in our replicate.
[3]SEM showed very well defined faceted crystals with dimensions as high as 3 micrometers.
The Rubin et al process produces very large crystallites, uses costly raw materials and operates at a low autoclave throughput, hence it is expensive.

In an alternative embodiment of the present invention as described in U. S..Application Ser. No. 646,977 filed Sept. 4, 1984 and now abandoned, the entire contents of which are incorporated herein by reference, the small size crystallites can be produced by synthesizing ZSM-5 in an aqueous medium from sources of silica, soda and alumina in a specific concentration reaction mixture which contains a polyol such as ethylene glycol and with trace amounts of tetrapropyl ammonium ions (Q) as nucleation agents, novel crystallites having dimensions below about 0.3 micrometer can be produced which have low levels of blocking Q ions present in the as synthesized form. As set forth in Ser. No. 646,977, now abandoned, all of the other synthesis parameters discussed with respect to the TMS process also apply to this alternative embodiment.

Because the crystallites as synthesized from the aqueous medium exhibit only a small fraction of blocking cations, there is always a diffusion path for the sodium ions to be exchanged without a need of prior removal of the blocking cations by calcination or otherwise. Merely by water washing the zeolite, the ethylene glycol and excess NaOH may be removed from the structure. The degree of removal depends on the extent of washing. By contacting the product with a solution of an ammonium salt such as $NH_4NO_3$, the sodium ion is readily exchanged and the zeolite is essentially converted to the ammonium form.

Using just ethylene glycol alone does not produce the desired small size crystallites. Instead, it is necessary to have a small amount of the tetrapropylammonium ion present.

The method uses a mixture containing a source of silica, a source of alumina, a source of alkali metal hydroxide such as sodium hydroxide, water, a polyol such as ethylene glycol, and a small amount of tetrapropyl ammonium ions. The amount of tetrapropyl ammonium ions in the reaction mixture is such that it is at least an effective amount and in an amount expressed in moles which is less than 1/120 of the sum of the number of moles of Si in the reaction slurry multiplied by 0.8 and the number of moles of Al in the reaction slurry. After the mixture is reacted in a heated reactor such as an autoclave, the ZSM-5 zeolite product is recovered.

In one embodiment we add a small amount of QBr solid crystals to water to assure complete dissolution of the crystals and then the dissolved QBr is mixed with the other materials to form the desired small size ZSM-5 zeolites or silicalite. In another embodiment we utilize a special seeding material to initiate nucleation.

The seeding material for the seeding material embodiment is made from a dilute system containing silica, alumina, soda, water and trace amounts of QBr. For example, a mole ratio of 1000 $SiO_2$: $Al_2O_3$: 45 $Na_2O$: 30,000 $H_2O$:30 QBr can be typically used. In this seeding material the silica to alumina ratio can be very high. The material may be heated for a few hours at a high temperature such as 80°–100° C. prior to use, although the heating step is not critical. The exact nature of the seeding material is not known. For example, if the seeding material is dried into a powder, x-ray diffractometry fails to detect any crystallinity. However, it is believed that the fundamental ZSM-5 framework units begin to form in the seeding material or possibly that extremely small crystalline domains are formed, but cannot be detected because of their size. In summary, the reaction mixture contains no source of ZSM-5 crystallites which are discernible by powder x-ray diffraction. The small relative amounts of Q ions present in the seeding material are believed to initiate nucleation of seeding in the reaction system.

A reaction mixture can be prepared by adding a measured amount of seeding material to the other reactants such as silica, alumina, soda, a polyol such as ethylene glycol and water. The reactant mixture can then be transferred to a stirred autoclave where the major reaction takes place. Under the controlled hydrothermal conditions in the stirred reactor (autoclave) the crystallization reaction takes place in which the ethylene glycol appears to function in part as a template. The size of the ZSM-5 product is generally controlled by the amount of seeding material used.

By using a measured amount of seeding material to provide the ZSM-5 nuclei and by using a substantial amount of ethylene glycol, it is possible to synthesize any size crystallite of ZSM-5 below about 10 micrometers preferably below 1 micrometer and most preferably below 0.3 micrometer. The equivalent product concentrations are greater than 12% and preferably greater than 14% and the product throughputs are typically greater than 400 $Kg/m^3$/day and more preferably greater than 500 $Kg/m^3$/day.

Since ethylene glycol can be readily washed out of the ZSM-5 product, the major portion of the channels and intersections within each crystallite are free of any blocking organic substances after washing. Although the central part of each crystallite or scattered small clusters may contain some blocking Q ions, the proportion is so small compared to the total number of intersections that it does not impair the subsequent ion-exchange step. As a result, our process eliminates the required calcination step prior to the ion-exchanging as described in many previous ZSM-5 synthesis procedures.

The reaction slurries used in the present process have the following molar ratios of ingredients

|  | Broad | Preferred | Particularly Preferred |
|---|---|---|---|
| $SiO_2$ to $Al_2O_3$ | greater than 20–120 | 20–120 | 40–80 |
| $H_2O$ to $OH^-$ | 20–120 | 30–100 | 50–70 |
| Polyol to to ($SiO_2$+ $Al_2O_3$) | less than 1.0 | less than 0.50 | less than 0.20 |

-continued

|  | Broad | Preferred | Particularly Preferred |
|---|---|---|---|
| (Si+ Al) to $H_2O$ | 0.03–0.15 | 0.05–0.12 | 0.06–0.09 |
| O to U | less than 0.8 | less than 0.6 | less than 0.4 |
| Reaction Temp. (°C.) | 150–200 | 160–190 | 170–180 |
| Reaction Time (hrs.) | less than 24 | less than 12 | less than 8 |

The amount of $OH^-$ expressed above in moles is the sum of the moles of free alkali metal hydroxide and the moles of free tetrapropylammonium hydroxide. The term U is 1/96 of the sum of the number of moles of Si in the reacting mixture multiplied by 0.8 plus the number of moles of Al in the resulting mixture. In the synthesis essentially all of the Q charged to the reaction slurry becomes occluded in the reaction product. The upper amount of polyol given above is not critical. For example in a 60 $SiO_2$ to 1 $Al_2O_3$ system the upper amount of polyol would be 61 moles. This is clearly enough. Although the amount could be exceeded, there is no economic or process advantage to do so when making small size crystallites.

Our preferred method to prepare the reaction slurry is to first dilute the silica source (such as Ludox) with about one-third of the required de-ionized water. The seeding material or QBr and the ethylene glycol are mixed with another one-third of the de-ionized water and this mixture is poured into the dilute silica product. Finally, the sodium hydroxide and the sodium aluminate are mixed with the remainder of the de-ionized water and this mixture is then added with stirring to the previous two components. The resulting slurry is mixed and transferred to a stirred autoclave for synthesis.

The ZSM-5 can also be produced using a recycle of the mother liquor to avoid waste of valuable $SiO_2$, $Na_2O$ and ethylene glycol. As mentioned earlier, although essentially all of the Q ion and all of the alumina charged to the reaction mixture end up in the product, the silica only reacts partially and the soda and ethylene glycol remain in excess. A good portion of this mother liquor containing silica, soda and ethylene glycol can readily be separated from the product and recovered by filtration. When using the mother liquor to make a new synthesis slurry a full complement of alumina and QBr are added but only a fraction of the original amounts of silica, sodium hydroxide and ethylene glycol need be added. As such the composition of the made-up recycle slurry is the same as the composition of the initial slurry. If a different starting slurry composition is desired, this can also be achieved using the recycled mother liquor. The recycle scheme may be repeated numerous times without detriment to the properties and quality (including crystallite size) of the resulting product. As shown in Example 9 numerous recycle runs can be used with by-product mother liquor to produce ZSM-5 of high quality and of very small crystallite size using ethylene glycol and only trace amounts of QBr.

The polyols which may be used either alone or in combination include ethylene glycol, propanediols, butanediols, hexanediols, diethylene glycol, triethyleneglycol, polyethylene glycols, glycerol, and polysaccharides.

Ethylene glycol is a commodity chemical available from many sources and it is made by Baker and other companies.

EXAMPLE 19

This example illustrates the synthesis of zeolite ZSM-5 using ethylene glycol and a small amount of tetrapropyl ammonium ion (Q) using a seeding material according to the present invention.

A seeding material pool was prepared containing 3.20 g sodium aluminate (20% $Al_2O_3$, 17% $Na_2O$), 948.3 g Ludox (HS-40) containing 39.8% $SiO_2$, 43.6 g of 50% NaOH solution, 50.2 g tetrapropyl ammonium bromide (QBr), and 2791.6 g deionized water. This mixture was heated for 6 hours at 80° C., after which it was cooled and stored for future use. This system was denoted "Seed Material" and exhibited a composition expressed in moles of about 1000 $SiO_2$: $Al_2O_3$: 45 $Na_2O$: 30,000 $H_2O$: 30 QBr.

Next, a reaction mixture was prepared by weighing out the following ingredients: 150 g of "Seed Material," 24.0 g sodium aluminate, 388.1 g Ludox HS-40, 32.8 g 50% NaOH solution, 29.1 g ethylene glycol (EG) and 299.7 g deionized water. About one-third of the deionized water was added to the Ludox. Then the ethylene glycol and the 150 g of "Seed Material" were mixed together with another one-third of the deionized water. This mixture was then added to the diluted Ludox. Finally, the sodium hydroxide and the sodium aluminate were mixed with the remaining deionized water and then added into the Ludox mixture. The resulting system contained the following weights of ingredients:

| Ingredient | Weight (g) |
|---|---|
| $SiO_2$ | 169.2 |
| $Al_2O_3$ | 4.825 |
| $Na_2O$ | 17.47 |
| QBr | 1.962 |
| E.G. | 29.10 |
| $H_2O$ | 701.01 |
| TOTAL: | 923.6 |

The density of the mix was about 1.16 g/cm$^3$ and its volume was about 796 cm$^3$. The composition expressed in moles relative to $Al_2O_3$ was: 59.6 $SiO_2$:$Al_2O_3$:5.96 $Na_2O$:823 $H_2O$:9.92 EG: 0.156 QBr. The resulting slurry was mixed by hand stirring and then immediately heated in a stirred autoclave until it reached about 175° C. which took under 0.5 hour. The temperature was then maintained for 7.5 hours at about 175° C. The resultant product was cooled to room temperature, removed, filtered, washed using 1 liter of warm deionized water and dried overnight at 120° C. The product weighted 147 g. The equivalent product concentration was calculated to be 15.9 weight percent.

A portion of this product was subjected to powder x-ray diffraction analysis and identified as pure ZSM-5 with a degree of crystallinity of 100%. The sample prepared was considered to be essentially pure ZSM-5 in the sodium form although it contained a trace of Q ions.

From these data, the autoclave throughput was calculated to be about 554 Kg/m$^3$/day. Chemical analysis of the product gave:

91.50% $SiO_2$, 3.30% $Al_2O_3$: 2.40% $Na_2O$ and 0.93% C.

The composition of the as-prepared-and-water-washed product, expressed in moles was about:

47.1 $SiO_2$:$Al_2O_3$:1.20 $Na_2O$:2.40 C. The concentration of $Al_2O_3$ (3.30%) coupled with the weight of sample prepared (147 g) was used to calculate the weight of alumina in the zeolite (4.851 g) which, within normal experimental analytical errors, corresponded to the weight of $Al_2O_3$ in the sodium aluminate used in the preparation (4.825 g). In other words, the $Al_2O_3$ reacted quantitatively.

In the case of $SiO_2$, however, only about 134.5 g ended up in the zeolite. This amount represented about 80% of the starting weight of $SiO_2$ used (169.2 g). About 34.7 g remained in solution in the mother liquor together with much of the $Na_2O$ employed. The mother liquor contained about 13.94 g of the 17.47 g of $Na_2O$ charged to the reactor.

The mother liquor also contained most of the bromide ion from the QBr as well as ethylene glycol and, of course, water, but did not contain Q ions.

The product was then ion-exchanged with 2% $NH_4NO_3$ aqueous solution, followed by a warm water rinse and dried at 120° C. Upon analysis, the resulting chemical composition was found to be

| Ingredient | Weight % on a dry basis |
|---|---|
| $SiO_2$ | 94.14 |
| $Al_2O_3$ | 3.49 |
| $Na_2O$ | 0.036 |
| C | 0.72 |
| Br | 0.0194 |

The analysis of carbon showed that the amount of carbon contained in the exchanged zeolite corresponded within normal experimental analytical errors to the carbon in the amount of QBr employed to prepare the sample. In other words all of the Q ion charged to the autoclave ended up occluded within the ZSM-5 zeolite structure.

The analytical data of the as-prepared zeolite and of the ammonium exchanged sample, coupled with the starting weights and the weight of the zeolite obtained, were used to compute the composition of the average unit cell of the two zeolites as per Formula (2).

For the as-prepared-and-water-washed sample, we obtained:

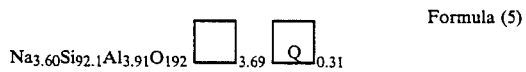

Formula (5)

$Na_{3.60}Si_{92.1}Al_{3.91}O_{192}$ [ ]$_{3.69}$ [Q]$_{0.31}$

The sodium and carbon analyses indicated that this sample included, besides the composition shown, some free NaOH and ethylene glycol within its structure (probably due to insufficient water washing)

The occluded Q ions blocked only 0.31 out of four intersections or about 7.8% of all the intersections within the structure. The balance, or approximately 92% of the intersections, remained open to diffusion and flow. The "open" nature of the porous network was the fundamental reason why the sample could be ion exchanged without prior calcination to remove excessive levels of blocking Q ions.

For the ammonium exchanged sample, the symbolic representation of the average unit cell was:

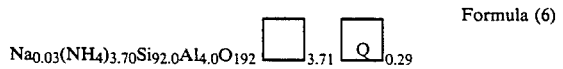

Formula (6)

$Na_{0.03}(NH_4)_{3.70}Si_{92.0}Al_{4.0}O_{192}$ [ ]$_{3.71}$ [Q]$_{0.29}$ which showed that the zeolite existed essentially in the pure $NH_4^+$ form. Less than 1% of the acid sites were in the $Na^+$ form. The silicon to aluminum ratio was, within normal experimental analytical errors, the same as the parent zeolite. The number of occluded Q ions (0.29) was also essentially the value (0.31) obtained for the parent sample.

A portion of the ammonium form of the product weighing about 5 g was placed in a crucible and calcined in air to convert it to the catalytically active $H^+$ form. Calcination was carried out at 1000° F. for 3 hours. A weight loss of about 4% was measured, which was attributed to the decomposition of the $NH_4^+$ ions to $NH_3$ gas and $H^+$, the oxidation and decomposition of the Q ions to $CO_2$, $H_2O$ and $N_2$ and the evaporation of the water still present in the sample. The final product is essentially represented by:

Formula (7)

$H_4Si_{92}Al_4O_{192}$ [ ]$_4$

Photographs of the product taken by Scanning Electron Microscopy (SEM) showed aggregates of crystallites ranging in size from about 0.1 to 0.3 micrometer.

This example shows that the process according to the present invention produces a ZSM-5 zeolite having a very high degree of crystallinity and excellent crystalline purity. The very small crystallites are produced using only traces of QBr which allows for easy exchange of the sodium without the need of any precalcination. The cost of the reactants used is low, the throughput of material in the process is very high, the process does not generate noxious wastes and is therefore a superior, practical and economical industrial process to manufacture ZSM-5.

EXAMPLE 20

This example illustrates the synthesis of zeolite ZSM-5 using ethylene glycol and a small amount of Q according to the present invention.

A reaction mixture was prepared by weighing out the following ingredients: 1.95 g tetrapropyl ammonium bromide (QBr) crystals, 24.0 g sodium aluminate solution (20% $Al_2O_3$ and 17% $Na_2O$), 425.8 g Ludox HS-40 (39.8% $SiO_2$), 34.6 g 50% NaOH solution, 23.3 g ethylene glycol (EG) and 385.2 g deionized water. About one-third of the deionized water was added to the Ludox. The 1.95 g QBr was dissolved in another one-third of the deionized water and then mixed with the ethylene glycol. This mixture was then added to the diluted Ludox. Finally, the sodium hydroxide and the sodium aluminate were mixed with the remaining deionzied water and then added into the previous mixture. The resulting slurry weighed about 895 g, exhibited a density of about 1.16 g/cm³ and a volume of about 772 cm³. It had a composition expressed in moles of about:

60 $SiO_2$:$Al_2O_3$: 6 $Na_2O$: 800 $H_2O$: 8 EG: 0.155 QBr. The resulting slurry was mixed by hand stirring and then immediately heated in a stirred autoclave until it reached about 175° C. which took under 0.5 hour. The temperature was then maintained for 7.5 hours at about 175° C. The resultant product was cooled to room temperature, removed, filtered, washed using 1 liter of warm deionized water and dried overnight at 120° C. The product weighed 126 g. The equivalent product concentration was calculated to be 14.1% and the autoclave throughput about 490 Kg/m³/day.

A portion of this product was subjected to powder x-ray diffraction analysis and found to be pure ZSM-5 crystals with a degree of crystallinity of about 100%. The sample was examined by SEM and found to consist of small aggregates of crystallites of about 0.1-0.3 micrometer size. Chemical analysis showed 91.0% SiO$_2$, 3.81% Al$_2$O$_3$, 2.90% Na$_2$O and 0.88% C. The composition of the product expressed in terms of one unit cell was calculated to be:

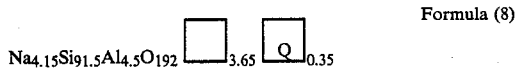

Formula (8)

Na$_{4.15}$Si$_{91.5}$Al$_{4.5}$O$_{192}$ ☐$_{3.65}$ ☐Q$_{0.35}$

EXAMPLE 21

The product obtained in Example 20 is directly ion-exchanged with 2% NH$_4$NO$_3$ solution, followed by a warm water wash and dried at 120° C. Upon analysis, the resulting chemical composition expressed in terms of one unit cell is calculated to be essentially:

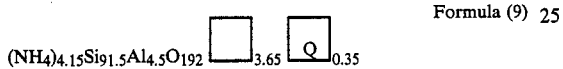

Formula (9)

(NH$_4$)$_{4.15}$Si$_{91.5}$Al$_{4.5}$O$_{192}$ ☐$_{3.65}$ ☐Q$_{0.35}$ which corresponds to an open porous, structure essentially in the ammonium form. The product is calcined at 1000° F. in air for a period of 3 hours and it loses ammonia and the Q ions are burnt off to yield a final product for catalyst use represented by:

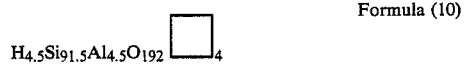

Formula (10)

H$_{4.5}$Si$_{91.5}$Al$_{4.5}$O$_{192}$ ☐$_4$

The following Examples 22-24 show other ZSM-5 products made with varying silica to alumina ratios.

EXAMPLE 22

A reaction slurry was prepared using the general method of Example 20, but with a reaction slurry composition expressed in relative moles of about: 30 SiO$_2$:Al$_2$O$_3$: 3 Na$_2$O: 400 H$_2$O: 4 EG: 0.077 QBr. The amount of alumina was essentially doubled. Powder x-ray diffraction analysis of the final product showed pure ZSM-5 zeolite.

EXAMPLE 23

A reaction slurry was prepared using the general method of Example 20, but with a reaction slurry composition expressed in relative moles of about: 20 SiO$_2$:Al$_2$O$_3$: 2 Na$_2$O: 267 H$_2$O: 2.67 FG: 0.052 QBr The amount of alumina was about tripled. Again, powder x-ray diffraction analysis of the final product showed pure ZSM-5 zeolite.

EXAMPLE 24

A reaction slurry was prepared using the general method of Example 19, but with a reaction slurry composition expressed in relative moles of about: 120 SiO$_2$:Al$_2$O$_3$: 16 Na$_2$O: 1600 H$_2$O: 16 EG: 0.31 QBr Powder x-ray diffraction of the final product showed pure ZSM-5 zeolite.

EXAMPLE 25

This example illustrates the importance of a small amount of QBr in making small crystallite size ZSM-5 zeolite.

A reaction slurry was prepared following the general method described in Example 20, but with a reaction slurry composition expressed in relative moles of about: 60 SiO$_2$:Al$_2$O$_3$: 4.5 Na$_2$O: 800 H$_2$O: 10 EG: 0.155 QBr Powder x-ray diffraction of the final product showed pure ZSM-5 zeolite of excellent degree of crystallinity. Examination of the product by Scanning Electron Microscopy showed it to consist of aggregates of small crystallites of about 0.3 micrometer size.

In contrast a sample prepared identically, except that the QBr ingredient was deliberately deleted from the reaction slurry, revealed by SEM examination large size ZSM-5 crystallites, namely, about 3.0 micrometers. In every other key respect the two samples were essentially the same.

Example 26

This example illustrates the effect of the addition of ZSM-5 seeds in the preparation of the ZSM-5 Zeolite using ethylene glycol.

A reaction slurry was prepared using the general method described in Example 20 except that in place of the QBr solution, ZSM-5 seeds were used to form a reaction slurry composition expressed in relative moles of about:

60 SiO$_2$:Al$_2$O$_3$:8 Na$_2$O:800 H$_2$O:8 EG Note that the slurry contained no QBr, instead 1.5 g of ZSM-5 seeds were used. The ZSM-5 seeds had been obtained from a previous run using our standard method and exhibited a crystallite size of approximately 0.2 micrometer. Care was taken to ensure that the seeds were adequately dispersed in the slurry. The slurry was charged to an autoclave which was sealed and heated under agitation over a period of about ½ hour to a temperature of 175° C., which temperature was held for a period of about 7½ hours. At the end of the 8 hour heating cycle, the charge was allowed to cool to room temperature, taken out of the autoclave, filtered, washed with warm water, and finally dried. Powder x-ray diffraction analysis showed the material to be pure ZSM-5 with an excellent degree of crystallinity. Examination of the product by scanning electron microscopy showed well-defined polyhedral crystallites with dimensions of about 1-3 micrometers. This example shows that the use of ZSM-5 crystal seeds instead of QBr results in large crystallites.

EXAMPLE 27

This example illustrates the capability of our method to recycle mother liquor in the synthesis of ZSM-5 in order to avoid waste of valuable SiO$_2$, Na$_2$O and ethylene glycol.

As indicated in Example 19, all of the Q ion and all of the alumina charged to the reaction mixture end up in the product. This is not the case for the silica which only reacts to about 80% of the level used in the reaction mixture, nor the soda or ethylene glycol. These substances, together with water, constitute the mother liquor which comes out of the autoclave step mixed with the ZSM-5 product. A good portion of this mother liquor can readily be separated from the product by filtration.

The general method used for recycling all or part of the mother liquor is to form a synthesis slurry of the original run composition using smaller amounts of soda, ethylene glycol and silica since these materials can be supplemented from the mother liquor and a full complement of alumina and QBr but only a fraction of the silica, sodium hydroxide and ethylene glycol.

The recycle scheme may be repeated numerous times without detriment to the properties and quality (including crystallite size) of the resulting product. The specific details which follow apply to an original run prepared as per the procedure of Example 1 and five consecutive runs in which mother liquor was recycled. After five consecutive successful recycle runs, 516 g of the mother liquor resulting from the fifth recycle run with a pH of 11.4 and a silica content of 4.06% was obtained. A sixth recycle run slurry was prepared by mixing 200 g of the mother liquor with 303 g of HS-40 Ludox. A solution containing 150 g of seed material as described in Example 1, 6 g of ethylene glycol and 100 g of mother liquor was added to the Ludox mix. The 7 g of NaOH (50%) and 24 g of sodium aluminate (20% $Al_2O_3$ and 17% $Na_2O$) was mixed and diluted in another 100 g of mother liquor. The second solution was slowly added to the Ludox mix with vigorous stirring to give the final reaction slurry which exhibited a pH of 12.9. The mole ratio of silica to alumina of the slurry was about 54:1. The reaction slurry was processed as per the procedure of Example 19. The weight of the ZSM-5 product obtained was 124 g, the powder x-ray diffraction analysis showed pure ZSM-5 of excellent degree of crystallinity and the scanning electron microscope revealed the crystallite size to be about 0.20 micrometer. The chemical analysis of the final product was 2.25% $Na_2O$, 0.79% carbon, 3.72% $Al_2O_3$ and 93.9% $SiO_2$. The silica to alumina ratio of the final zeolite was 42.9 to 1.

This example demonstrates the feasibility of numerous recycle runs using by-product mother liquor to produce ZSM-5 of high quality and of very small crystallite size using ethylene glycol and only trace amounts of QBr.

Other prior art processes to make ZSM-5 have been discussed earlier. The Taramasso et al process which used polyols, but without any Q ions, discloses 8 days of autoclaving to complete their ZSM-5 synthesis. Their equivalent product concentration is calculated to be less than 3% as compared to values of greater than 12% obtained by the present process. The reactor throughput is calculated to be less than about 4 Kg/m³/day compared to values of greater than 480 Kg/m²/day obtained in Examples 19 and 20.

It is understood that the foregoing detailed description is given merely by way of illustration and that many variations may be made therein without departing from the spirit of this invention.

What is claimed is:

1. Small crystallites of ZSM-5
   (a) having a $SiO_2$ to $Al_2O_3$ mole ratio R greater than 5,
   (b) having crystallites with their smallest dimension below about 0.3 micrometer,
   (c) having a crystallinity of greater than 71% as measured by X-ray diffraction,
   (d) having an average unit cell as synthesized and water washed represented by the formula

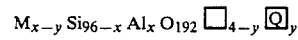

where $$R = \frac{2(96 - x)}{x}$$

x is the average number of Al atoms in the unit cell,
M represents an alkali metal cation,
y is less than 0.8 but greater than zero,
□ represents the intersections of the channels inside the ZSM-5 porous framework free of tetrapropyl ammonium ions, and
[Q] represents the intersections of the channels inside the ZSM-5 porous framework having occluded tetrapropyl ammonium ions, said crystallites being ion-exchangeable without requiring a preliminary calcination step and without prior removal of the occluded tetrapropyl ammonium ions.

2. The small crystallites of ZSM-5 of claim 1, wherein M in the formula is Na.

3. The small crystallites of ZSM-5 of claim 1, which has been ammonium ion exchanged and where M in the formula is $NH_4$.

4. The small crystallites of ZSM-5 of claim 1, wherein M in the formula is H.

5. The small crystallites of ZSM-5 of claim 4, wherein the cation M has been at least partially replaced by the equivalent amount of lanthanide ion.

6. A process to make a ZSM-5 zeolite
   (a) having a $SiO_2$ to $Al_2O_3$ mole ratio R between about 20 and 120,
   (b) having crystallites with their smallest dimension below about 0.3 micrometer, and
   (c) having a crystallinity of greater than 71% as measured by X-ray diffraction,
   (d) having an average unit cell represented by the formula

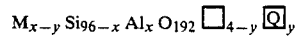

where $$R = \frac{2(96 - x)}{x}$$

M represents monovalent cations,
x is the average number of Al atoms in the unit cell,
□ represents the intersections of the channels inside the ZSM-5 porous framework free of tetrapropyl ammonium ions, and
[Q] represents the intersections of the channels inside the ZSM-5 porous framework having occluded tetrapropyl ammonium ions, comprising reacting a mixture containing a source of silica, a source of alumina, a source of alkali metal hydroxide, water, and an organic template consisting essentially of tetrapropyl ammonium ions in the reaction mixture in an effective amount but less than that which corresponds to y=0.8 and in an amount such that the mole ratio of tetraproyl ammonium ions to $SiO_2$ in said reaction mixture is 0.0087 or less, and recovering ZSM-5 zeolite product which is ion-exchangeable without requiring a preliminary calcination step.

7. A process according to claim 6, wherein the amount of tetrapropyl ammonium ions being present in the reaction mixture is an amount less than that which corresponds to y=0.6 in the formula.

8. A process according to claim 6, wherein the amount of tetrapropyl ammonium ions being present in the reaction mixture is an amount less than that which corresponds to y=0.4 in the formula.

9. A process according to claim 6, wherein the mother liquor from a previous synthesis is recycled to supply part of the reaction mixture.

10. The uncalcined ZSM-5 zeolite made by the process of claim 6.

11. A process according to claim 6, wherein the mole ratio of the tetrapropyl ammonium ions to the $SiO_2$ in the reaction mixture is 0.0052 or less.

12. A process according to claim 6, wherein the mole ratio of the tetrapropyl ammonium ions to the $SiO_2$ in the reaction mixture is 0.0026 or less.

13. A process according to claim 6, wherein the mole ratio of the tetrapropyl ammonium ions to the $SiO_2$ in the reaction mixture is 0.0013 or less.

14. A process according to claim 6, wherein the mole ratio of the tetrapropyl ammonium ions to the $SiO_2$ in the reaction mixture is 0.00087 or less.

15. A process according to claim 6, wherein the mole ratio of the tetrapropyl ammonium ions to the $SiO_2$ in the reaction mixture is 0.00052 or less.

16. A process according to claim 6, wherein the mole ratio of the tetrapropyl ammonium ions to the $SiO_2$ in the reaction mixture is 0.00017 or less.

17. A process to make a ZSM-5 zeolite having a $SiO_2$ to $Al_2O_3$ mole ratio R greater than 5, having crystallites with their smallest dimension below about 0.3 micrometer and having a crystallinity of greater than 71% as measured by X-ray diffraction comprising
reacting a mixture containing a source of silica, a source of alumina, a source of alkali metal hydroxide, water, and an organic template consisting essentially of tetrapropyl ammonium ions in the reaction mixture in an effective amount but less than 0.8U in which U is 1/96 of the sum of
(1) the number of moles of Si in the reacting mixture multiplied by 0.8 plus
(2) the number of moles of Al in the reacting mixture, and recovering ZSM-5 zeolite product which is ion-exchangeable without requiring a preliminary calcination step and without prior removal of the occluded tetrapropyl ammonium ions.

18. A process according to claim 17 wherein the amount of tetrapropyl ammonium ions being present in the reaction mixture is an amount less than 0.6U.

19. A process according to claim 17, wherein the amount of tetrapropyl ammonium ions being present in the reaction mixture is an amount less than 0.4U.

20. A process according to claim 17, wherein the mother liquor from a previous synthesis is recycled to supply part of the reaction mixture.

21. A process according to claim 17, wherein the reaction mixture at the onset of the reaction contains no source of ZSM-5 crystallites which are discernible by powder x-ray diffraction.

22. A process according to claim 17, wherein the reaction slurry mixture has the following molar ratios of ingredients

| | |
|---|---|
| $SiO_2$ to $Al_2O_3$ | greater than 6 |
| $H_2O$ to $OH^-$ | 20–120 |
| (Si + Al) to $H_2O$ | 0.03–0.15 |
| Q to U | less than 0.8 | wherein essentially all of the Q charged to the reaction slurry becomes occluded in the reaction product; wherein essentially all of the $Al_2O_3$ charged to the reaction slurry becomes a part of the covalent network of the reaction product; and wherein the reaction temperature is from 100°–280° C. and the reaction time is less than 24 hours.

23. A process according to claim 22, wherein molar ratios of ingredients are

| | |
|---|---|
| $SiO_2$ to $Al_2O_3$ | 20–120 |
| $H_2O$ to $OH^-$ | 30–100 |
| (Si + Al) to $H_2O$ | 0.05–0.12 |
| Q to U | less than 0.6 | and wherein the reaction temperature is from 140°–230° C. and the reaction time is less than 12 hours.

24. A process according to claim 23, wherein the molar ratios of ingredients are

| | |
|---|---|
| $SiO_2$ to $Al_2O_3$ | 40–80 |
| $H_2O$ to $OH^-$ | 50–70 |
| (Si + Al) to $H_2O$ | 0.06–0.09 |
| Q to U | less than 0.4 | and wherein the reaction temperature is from 170°–190° C. and the reaction time is less than 8 hours.

25. A process according to claim 17 wherein said ZSM-5 produced has
a high degree of crystallinity
an occluded carbon content as prepared and water washed of less than 0.1 mole of carbon per mole of total silicon and aluminum contained in said ZSM-5;
a zeolitic alkali metal content as prepared and water washed of less than one mole per mole of contained aluminum;
a high degree of crystalline purity exhibiting a single phase crystalline material;
the capacity to be readily exchangeable without prior removal of Q ions; and
containing as prepared and water washed less than 1/120 mole of nitrogen per mole of total silicon and aluminum contained in said ZSM-5.

26. The uncalcined ZSM-5 zeolite made by the process of claim 17.

27. A process to produce silicalite wherein there is essentially no alumina present having crystallites with their smallest dimension below about 0.3 micrometer and having a crystallinity of greater than 71% as measured by X-ray diffraction comprising
reacting a mixture containing a source of silica, a source of alkali metal hydroxide, essentially no alumina except as impurity, water, and an organic template consisting essentially of tetrapropyl ammonium ions in the reaction mixture in an effective amount but less than 0.8U in which U is 1/96 of the sum of
(1) the number of moles of Si in the reacting mixture multiplied by 0.8 plus
(2) the number of moles of Al in the reacting mixture, and recovering silicalite product which is ion-exchangeable without requiring a preliminary calcination step and without prior removal of the occluded tetrapropyl ammonium ions.

28. Uncalcined silicalite made by the process of claim 27.

29. A nonpolluting process to make a ZSM-5 zeolite
(a) having a SiO$_2$ to Al$_2$O$_3$ mole ratio R greater than 5,
(b) having crystallites with their smallest dimension below about 0.3 micrometer,
(c) having a crystallinity of greater than 71% as measured by X-ray diffraction, and
(d) having an average unit cell represented by the formula

where $$R = \frac{2(96 - x)}{x}$$

M represents monovalent cations,
x is the average number of Al atoms in the unit cell,
□ represents the intersections of the channels inside the ZSM-5 porous framework free of tetrapropyl ammonium ions, and
$\boxed{Q}$ represents the intersections of the channels inside the ZSM-5 porous framework having occluded tetrapropyl ammonium ions,
comprising
(i) reacting a mixture containing a source of silica, a source of alumina, a source of alkali metal hydroxide, water, and an organic template consisting essentially of tetrapropyl ammonium ions in the reaction mixture in an effective amount but less than that which corresponds to y=0.8 in the formula and in an amount such that the mole ratio of tetrapropyl ammonium ions to SiO$_2$ in said reaction mixture is less than 0.01108, said mixture having an equivalent product concentration greater than 12%, at a rate corresponding to a throughput greater than 400 Kg/m$^3$/day, and
(ii) recovering ZSM-5 zeolite product which is ion-exchangeable without requiring a preliminary calcination step and without prior removal of the occluded tetrapropyl ammonium ions.

30. A process according to claim 29 wherein the equivalent product concentration is greater than 14% and the throughput is greater than 500 Kg/m$^3$/day.

31. A process for making a catalyst comprising
(a) mixing together a reaction slurry as defined in claim 6;
(b) heating the reaction slurry at a temperature of from about 100°-280° C. for less than 24 hours to produce a ZSM-5 zeolite and a mother liquor;
(c) cooling the reaction materials from step (b);
(d) filtering the cooled materials to obtain the zeolite reaction product;
(e) washing the filtered zeolite;
(f) cation exchanging the washed zeolite;
(g) blending the exchanged zeolite with catalyst forming materials;
(h) forming the blended material into a formed particle;
(i) drying the formed particle; and
(j) calcining the dried particle to yield a ZSM-5 zeolite containing catalyst.

32. A process according to claim 31, wherein the catalyst forming material is at least a matrix material.

33. A process according to claim 31, wherein the cation exchange is made with NH$_4^+$ ions.

34. A process according to claim 31 wherein the cation exchange is made with NH$_4^+$ ions and lanthanide ions.

35. A process according to claim 31, wherein the cation exchange is made with H$^+$ ions.

36. A process according to claim 31, wherein the cation exchange is made with H$^+$ ions and lanthanide ions.

37. A process for making a catalyst comprising
(a) mixing together a reaction slurry as defined in claim 17;
(b) heating the reaction slurry at a temperature of from about 100°-280° C. for less than 24 hours to produce a ZSM-5 zeolite and a mother liquor;
(c) cooling the reaction materials from step (b);
(d) filtering the cooled materials to obtain the zeolite reaction product;
(e) washing the filtered zeolite;
(f) cation exchanging the washed zeolite;
(g) blending the exchanged zeolite with a matrix material;
(h) forming the blended material into a formed particle;
(i) drying the formed particle; and
(j) calcining the dried particle to yield a ZSM-5 zeolite containing catalyst.

38. A process according to claim 37, wherein the cation exchange is made with NH$_4^+$ ions.

39. A process according to claim 37, wherein the cation exchange is made with NH$_4^+$ ions and lanthanide ions.

40. A process according to claim 37, wherein the exchange is made with H$^+$ ions.

41. A process according to claim 37, wherein the cation exchange is made with H$^+$ ions and lanthanide ions.

42. A process to produce silicalite
(a) having crystallites with their smallest dimension below about 0.3 micrometer, and
(b) having an average unit cell represented by the formula

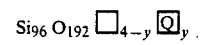

where
□ represents the intersections of the channels inside the ZSM-5 porous framework free of tetrapropyl ammonium ions, and
$\boxed{Q}$ represents the intersections of the channels inside the ZSM-5 porous framework having occluded tetrapropyl ammonium ions, comprising
reacting a mixture containing a source of silica, a source of alkali metal hydroxide, essentially no alumina except as impurity, water, and an organic template consisting essentially of tetrapropyl ammonium ions in the reaction mixture in an effective amount but less than that which corresponds to y=0.8 and in an amount such that the mole ratio of tetrapropyl ammonium ions to $SiO_2$ in the reaction slurry is 0.00792 or less, and recovering the silicalite product which is water washable without requiring a preliminary calcination step.

43. Uncalcined silicalite made by the process of claim 42.

* * * * *